(12) United States Patent
Fujiwara et al.

(10) Patent No.: US 6,381,601 B1
(45) Date of Patent: Apr. 30, 2002

(54) GROUPING AND DUPLICATE REMOVAL METHOD IN A DATABASE

(75) Inventors: Shinji Fujiwara, Sagamihara; Kazutomo Ushijima, Kokubunji; Itaru Nishizawa, Kodaira, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/469,615

(22) Filed: Dec. 22, 1999

(30) Foreign Application Priority Data

Dec. 22, 1998 (JP) .......................................... 10-364729

(51) Int. Cl.$^7$ .............................................. G06F 17/30
(52) U.S. Cl. .......................................... 707/7; 711/216
(58) Field of Search ................................ 707/7; 711/216

(56) References Cited

U.S. PATENT DOCUMENTS

| | | | | |
|---|---|---|---|---|
| 5,515,531 A | * | 5/1996 | Fujiwara et al. ................ | 707/3 |
| 5,842,207 A | * | 11/1998 | Fujiwara et al. ................ | 707/7 |
| 5,873,074 A | * | 2/1999 | Kashyap et al. ................ | 707/2 |
| 5,890,150 A | * | 3/1999 | Ushijima et al. .............. | 707/3 |
| 5,978,793 A | * | 11/1999 | Kashyap et al. ................ | 707/2 |
| 6,014,655 A | * | 1/2000 | Fujiwara et al. ................ | 707/1 |
| 6,115,705 A | * | 9/2000 | Larson ........................... | 707/3 |

FOREIGN PATENT DOCUMENTS

JP        2000250921     *  9/2000

OTHER PUBLICATIONS

"Parallel Sorting Algorithms", Selim G. Akl, Academic Press, Inc. 1985 pp. 48–49.

"Relational Database Management" M. Papazoglou, W.Valder, Prentice Hall. 1989 pp. 262–264.

"Hash Joins and Teams in Microsoft SQL Server" Goetz Graefe, Ross Bunker, Shaun Cooper, 24$^{th}$ International Conference of Very Large Database. 1998 pp. 86–97.

* cited by examiner

*Primary Examiner*—Maria N. Von Buhr
(74) *Attorney, Agent, or Firm*—Antonelli, Terry, Stout & Kraus, LLP

(57) ABSTRACT

In order to realize high speed process for grouping the records having the identical values of one or more columns of the input list, the input list is canned, a hash value is generated using a hash function in which a value of the column as the non-vacant partial aggregation of the columns for the grouping is used as the argument, and it is determined whether two or more records having the hash values exist or not. The input list is scanned again and the calculating process of the aggregation columns is immediately executed for the records having the hash value for which it is determined by the first scanning that there is only one record having the identical hash value, the result of such calculating process is output and the records are defined as the input of the ordinary grouping process for the records which are determined to exist as the two or more records.

18 Claims, 10 Drawing Sheets

FIG. 3

| FUNCTION NAME | CONVERTED VALUE |
|---|---|
| SUM(C1) | VALUE OF C1 |
| MIN(C1) | VALUE OF C1 |
| MAX(C1) | VALUE OF C1 |
| AVG(C1) | VALUE OF C1 |
| COUNT(C1) | 0 (C1=null) |
| COUNT(C1) | 1 (C1≠null) |
| COUNT(*) | 1 |

FIG. 8

```
SELECT P_BRAND, P_TYPE, P_SIZE, COUNT (DISTINCT PS_SUPPKEY)
FROM PARTSUPP, PART
WHERE P_PARTKEY = PS_PARTKEY
    AND P_BRAND <> 'Brand#45'
    AND P_TYPE NOT LIKE 'MEDIUM POLISHED%'
    AND P_SIZE IN (49, 14, 23, 45, 19, 3, 36, 9)
    AND PS_SUPPKEY NOT IN
        (SELECT S_SUPPKEY
        FROM SUPPLIER
        WHERE S_COMMENT LIKE '%Better Business Bureau%Complaints%')
GROUP BY P_BRAND, P_TYPE, P_SIZE
ORDER BY 4 DESC, P_BRAND, P_TYPE, P_SIZE ;
```

FIG. 10

| CONDITIONS FOR DETERMING GROUP-BY PROCESSING | | | METHOD # | GROUP-BY OPTIMIZING METHOD |
|---|---|---|---|---|
| GROUPING KEY INCLUDE DIVIDING KEY | NEXT IS FES | GROUPING UNIQUE KEY ASCENDING ACCESS | G1 | GROUP-BY PROCESSING PREPARED FOR SORTING, ONLY P-SCAN FOR NEXT FES |
| | | GROUPING UNIQUE KEY RANDOM ACCESS — GROUP DUPLICATE >1 OR ON MEMORY | G2 | HHGB, ONLY P-SCAN FOR NEXT FES |
| | | GROUPING UNIQUE KEY RANDOM ACCESS — GROUP DUPLICATE ≑1 AND MEM OVR | G2d | APPLY BITMAP GROUP BY, APPLY HHGB ONLY FOR RECORDS OF TWO OR LARGER THAN 2 DUPLICATE, ONLY P-SCAN FOR NEXT FES |
| | NEXT IS BES | GROUPING UNIQUE KEY ASCENDING ACCESS | G3 | GROUP-BY PROCESSING PREPARED FOR SORTING, ONLY P-SCAN FOR NEXT BES |
| | | GROUPING UNIQUE KEY RANDOM ACCESS — GROUP DUPLICATE >1 OR ON MEMORY | G4 | HHGB, ONLY P-SCAN FOR NEXT BES |
| | | GROUPING UNIQUE KEY RANDOM ACCESS — GROUP DUPLICATE ≑1 AND MEM OVR | G4d | APPLY BITMAP GROUP BY, APPLY HHGB ONLY FOR RECORDS OF TWO OR LARGER THAN 2 DUPLICATE, ONLY P-SCAN FOR NEXT BES |
| GROUPING KEY NOT INCLUDE DIVIDING KEY | NEXT IS FES | GROUPING UNIQUE KEY ASCENDING ACCESS | G5 | GROUP-BY PROCESSING PREPARED FOR SORTING, ONLY T-SCAN FOR NEXT FES, GROUP-BY PROCESSING PREPARED FOR SORTING |
| | | GROUPING UNIQUE KEY RANDOM ACCESS — GROUP DUPLICATE >>1 | G6 | REDISTRIBUTE BETWEEN HHGB (OR SHGB) AND BES, BY USE OF DIVIDING-KEY INCLUDING GROUPING KEY, AND APPLY G2 |
| | | GROUPING UNIQUE KEY RANDOM ACCESS — GROUP DUPLICATE ~1 | G7 | REDISTRIBUTE BETWEEN BES, BY USE OF DIVIDING-KEY INCLUDING GROUPING KEY, AND APPLY G2 OR G2d |
| | NEXT IS BES | GROUP DUPLICATE >>1 | G8 | AFTER HHGB (OR SHGB), TRANSFER TO NEXT BES BY USE OF DIVIDING KEY INCLUDING GROUPING KEY, AT NEXT BES, P-SCAN AND HHGB |
| | | GROUP DUPLICATE ~1 | G9 | REDISTRIBUTE BETWEEN BES, BY USE OF DIVIDING-KEY INCLUDING GROUPING KEY, AND APPLY G4 OR G4d |

GROUPING AND DUPLICATE REMOVAL METHOD IN A DATABASE

BACKGROUND OF THE INVENTION

The present invention relates to a grouping method for discriminating, as a group, plural records of database in which values of particular columns are identical and a duplicate removal method for deleting the overlapping records in a database.

In a dataware house system, a user or an application server issues a query to a database. Particularly, in these years, query has often been issued to a database from application servers such as multiple dimensional analysis server, data mining server and ERP (Enterprise Resource Planning) (business integration package). A database is generally composed of plural records and each record includes the data for a plurality of items. For example, a parts database including information about parts of a certain product is composed of records indicating the data of a certain part and each record includes the data of a plurality of items determined for such part. For instance, such data include size of part, strength, price and supplier, etc. These items are identical not depending on the part, therefore, on the record. Therefore, the database having such structure can generally be considered as the table format data. Each record corresponds to one part and each column corresponds to an item determined for the part. Such table format database will be discussed below. In this case, a database is called as a table or a table data and a certain record as a record data or only as a record in some cases. Aggregation of data corresponding each other in plural records regarding the same item is called as column data or only as a column. In the data warehouse system, a plurality of record data satisfying the conditions indicated by the query from users are retrieved from the database. The process designated by the query regarding a plurality of retrieved record data is further executed and the result of this retrieval is then notified to users. Aggregating process and grouping process are particularly often executed recently among the query of database. The aggregating process is the numerical value computing process to be executed for query result data by obtaining the maximum value, minimum value or average value of particular column data designated by query or obtaining the number of records attained as a result of query in regard to a plurality of record data attained as a result of query. The grouping process for sorting, as one group, plural records in which data of a plurality of pairs of columns (grouping columns) designated by query among plural records attained as a result of query are identical. In the grouping process, aggregating process is conducted for each group. The grouping process is used, for example, for the processes to obtain the average value of sales amount in every factor of age, region and sex. For instance, result of the grouping is composed of a set of the grouping column value and result of aggregation process.

As the grouping method of the related art disclosed in the system based on the merge and sort disclosed in "Parallel Sorting Algorithms," by Selim G. Akl, Academic Press, Inc. (USA), p. 48 and 49 and the hash system disclosed in "Relational Database Management", by M. Papazoglou, W. Valder, PRENTICE HALL (USA), p. 262 to 264 can be listed.

FIG. 4 illustrates a flow chart of the grouping by the merge sort system. In this merge sort system, all records are classified so that plural records in which the value of the particular column of plural records forming the database is identical belong to the same group and the records in which value of the column is different from that of the other records belong to the other group. Therefore, in the merge sort system, all records are sorted in regard to the particular column before the grouping. Namely, plural records are first read sequentially from the secondary memory.

Here, the secondary memory is assumed to be structured to perform data reading therefrom or data writing thereto in unit of a constant size called a block. One block generally includes plural records. Therefore, one block including plural records is read into the main memory (40). A plural records in the block read out are sorted for the data of any column using a working area on the main memory (41) and thereafter such record is written back to the secondary memory as one block (42). This process is repeated for a plurality of blocks until all records are read (43). After plural records sorted for each block (namely, record list) are formed in the secondary memory as explained above, merge sort is performed between these blocks using the working area in the secondary memory and a list of the sorted records belonging to all blocks is obtained in the secondary memory (44). After the process explained above, while the data belonging to the particular column of all records of the sorted record list is sequentially read from the secondary memory (45, 47), the grouping process is performed for the relevant column for these records (46). Namely, plural records having the identical value of the column belong to the same grouping and all records having the column values different from that of the other records are classified so that these records belong to the other groups.

In this merge sort system, since the merge sort of all records are performed in the step 44 using the working area in the secondary memory, a large amount of I/O operations are generated for the secondary memory and therefore a longer time is required for the merge sort process. In addition, the merge sort process (step 44) and grouping process (step 46) cannot be executed in parallel different from the process to be conducted in the pipeline and therefore access must be done again to the secondary memory for the purpose of grouping process (step 46) after the access to the secondary memory for the merge sort process (step 44). Therefore, the processing time which is identical to the total time required for the merge sort process and grouping process is required in this system and the total processing time becomes longer. As a method of solving this problem, a hash system has been introduced.

FIG. 5 illustrates a flow chart of the grouping process using the hash system of the prior art. In the hash system, when one block stored in the secondary memory is read on the main memory (50), the grouping process is performed using the hash functions by making use of the working area on the main memory for each record among plural records within the read out block (51). The aggregation result of each group held in the aggregating area in the main memory is updated by executing the parallel aggregating processes (52).

Namely, each time when the record is newly read into the working area on the main memory, the hash value is obtained for the data belonging to the particular columns among the data in such record and this record is then registered to the hash table prepared in the working area on the main memory. The hash table designates the pointer area and memory area of each record explained below and aggregation of the collecting area and pointer area provided in the successive position of the memory area of each record. Namely, in the hash table, a plurality of pointer areas holding a plurality of pointers corresponding to different hash values is prepared and when any record is newly read to the main memory, the hash value is calculated using the hash function for the data belonging to the particular record used for the grouping process among the data of such record. If the record having the such hash value is not yet detected, the pointer indicating the storing position in the main memory area of such record is stored in the pointer area corresponding to this hash value in this pointer area. As explained above, such record is registered to the group having such hash value. Moreover, such record is assumed as only a member of the group having such hash value and the aggregating process is conducted for such group using the data in such record under the above assumption and thereafter the aggregating process result data is stored to the aggregating area next to the storing area of such record. The subsequent area of this aggregating area is reserved as the area for storing the pointer which points out the other records belonging to the same group.

When the other record having the hash value for the record newly read into the main memory explained above is already registered to the above hash table, an address of the storing area of this new record is stored to the successive pointer storing area of the record which is already registered. As explained above, a new record is registered to the group having such hash value. Moreover, new aggregating area and pointer area are reserved to the subsequent storing area of the storing area of this new record. The aggregating process result is calculated for the group including this new record based on the aggregating result data already stored for the record which is already registered and the data in this new record and it is then written to the subsequent aggregating result area of the storing area of this new record in the new aggregating area. The process explained above is repeated for all records (55). However, when the number of records read into the main memory increases, the area of above hash table becomes too large to hold the next new record into the main memory. In this case, it is determined whether the next record can be stored to the hash table area of the main memory or not (53). When determination result is NO, the other records registered to the hash table is ruled out to the secondary memory (54) and the next new record process is started.

These grouping process (51) and aggregating process (52) can be executed in parallel as can be executed for the pipeline. In other words, the grouping process is executed for the read newly read into the main memory and thereafter the aggregating process is sequentially executed for the groups to which such record belongs. On the occasion of executing this aggregating process, the grouping process is also executed to the further successive records newly read into the main memory in parallel. Accordingly, the grouping process is conducted without generation of a temporary file for the grouping. However, data transfer is generated at random between the main memory and external memory in the step 54. Therefore, here rises a problem of the time required for I/O access to the external memory.

The grouping process introducing the hash grouping system is based on the remarkable reduction in number of records of the data through the grouping process. Therefore, when an average value (it is called as an average duplicate degree of group) between the groups of the group duplicate degree (number of records belonging to one group) is almost equal to 1, this method is not so much effective.

However, in the actual multiple-dimensional analysis, when the number of axes of analysis increases, many groups have only one record belonging to each group. In this case, there rises a problem that the hash table cannot be developed on the main memory in the hash system, many I/O operations are generated to the external memory and the time required for the grouping process increases. In addition, since the effect of reduction in number of records by the pre-grouping process cannot be obtained even in the multiple-stage converting system, there rises a problem also that the processing cost increases due to the overhead disassembled into multiple-stage.

In addition, a duplicate degree of record becomes a problem here even in regard to the duplicate removal process which is the basic process of the other query process. Here, the number of records having the identical record value is called as a duplicate degree of such record. When an average value of duplicate degree of each record (hereinafter, it is called as an average record duplicate degree) is almost equal to one (1), the duplicate record does not almost exist. In this case, it has been a problem that efficient process cannot be attained in the existing duplicate removal process and the system depending on the sort merge process must inevitably be introduced in this case.

BRIEF SUMMARY OF THE INVENTION

It is therefore an object of the present invention to provide a grouping method for realizing highly efficient grouping process in such a case that the average group duplicate degree is almost identical to one (1).

It is another object of the present invention to realize a duplicate removal method for realizing highly efficient duplicate removal process in such a case that the average group duplicate degree is almost identical to one (1).

In view of attaining the objects explained above, the grouping method of the present invention determines whether there is possibility or not for existence of at least another record having the identical value to that of at least a part of one or more predetermined columns of the records for each of plural records of the record list included in the database, also determines plural records of a part determined there is no possibility for existence of another record as the records belonging to one group respectively by above determination process, and executes the second process to classify a plurality of other groups other than a part of records explained above among plural records of the record list explained above so that plural records having the identical column value for the grouping belong to the same group.

In more practical, the step for determining possibility includes the steps for generating a hash value for each of plural records of record list included in the database with the hash function using as an argument the value of at least a part of one or more predetermined columns among those for the grouping of such records, determining whether at least another record having the hash value identical to that of the hash value generated for each record exists or not from a plurality of hash values generated for plural records, and also determining a part of plurality of records determined respectively that there is no other records having the identical hash values by such determination process as the records having no possibility that the other records having the identical value of at least a part of the columns among those for the grouping do not exist. This method is effective when the average grouping duplicate degree is almost identical one (1).

The duplicate removal method of the present invention can apply the process same as the grouping method explained above to the duplicate removal process.

Moreover, the present invention provides also the grouping process method in which bucket division is repeated and a plurality of hash functions are sequentially applied through the change-over operation for each repetition of bucket division.

BRIEF DESCRIPTION OF THE SEVERAL VIEWS OF THE DRAWINGS

FIG. 3 illustrates a function converting method in the aggregated column calculating process.

FIG. 8 illustrates an example of query suitable for application of the duplicate removal process illustrated in FIG. 6.

FIG. 10 illustrates the optimizing method of the grouping process in the present invention for a parallel database.

DETAILED DESCRIPTION OF THE PREFERRED EMBODIMENTS

Figure 1:
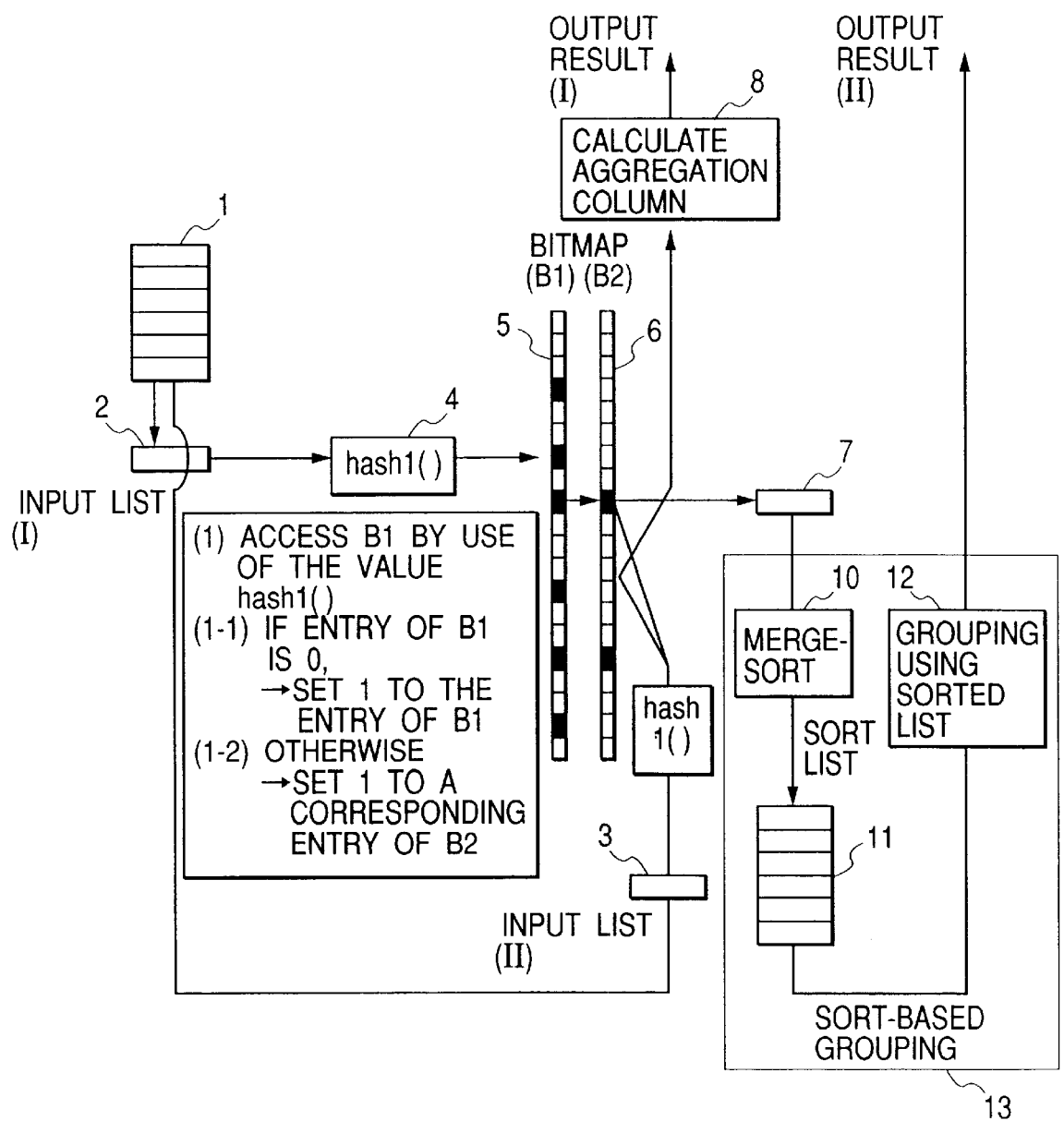
FIG. 1 illustrates summary of the grouping process in the present invention using the hash functions.

The grouping method and duplicate removal method of the present invention will explained in further detail with reference to several embodiments illustrated as the drawings. In the following explanation, the like elements are designated by the like reference numerals. In addition, difference from the first embodiment of the present invention will be mainly explained in the second and subsequent embodiments.

First Embodiment of the Invention

A database used in this embodiment is stored in an external memory (not illustrated) connected to a desired computer (not illustrated) and the processes explained below are executed by the processor(not illustrated) in the computer using the main memory (not illustrated) of the relevant computer and the external memory explained above. Here, such computer is assumed as a computer consisting of single processor (not illustrated) such as a work station or the like. However, this computer may be a parallel computer including many processors.

FIG. 1 schematically illustrates an embodiment of the grouping process in the present invention using a bitmap Sequence will be explained below.

(a) It is assumed that a record list 1 is detected as a result of query to database from a user. This record list also assumed to be stored in an external memory. All records in this record list 1 are sequentially read to a main memory from the external memory. For each record, a hash value is generated (4) by the hash function has1( ) using, as an argument, the value of hash column $H \subseteq G$, $H \neq \{ \}$ as the non-vacant partial aggregation of the column (grouping column) G={g1, ..., gk} used for the grouping. When one column G is used for the standard of grouping, the hash column H is identical to one column. When a plurality of columns G are used for the standard of grouping, the hash column H is identical to one column in a plurality of columns G or combination of a plurality of columns. The hash function hash1( ) is determined to be able to introduce the hash value less than the number of all values which the hash column H can take. Reference is made to the relevant entry of the bitmap B1(5) using this hash value as the address. The bitmap B1 has the bit storing area provided corresponding to all values which the hash function has1( ) can take for the hash column H.

(b) When the entry of bitmap B1 is 0, the bit of the relevant entry is set to 1. If the entry of the bitmap B1 is already 1, the corresponding entry of the bitmap B2(6) is set to 1. The bitmap B2 and bitmap B1 have the identical size and each bit storing area corresponds to one bit storing area in the bitmap B1. Above processes are repeated for all records. As a result of above processes, if the entry of bitmap B2 is 0, it is understood that there is only one record having the hash value corresponding to the relevant entry. When the entry of bitmap B2 is 1, it can be understood that there are plural records having the hash value corresponding to the relevant entry. When the corresponding entries of the bitmaps B1, B2 are 0, there is no record having the hash value corresponding to the relevant entry.

(c) The record list 1 is read again (3), a hash value is generated (9) with the hash function using a value of hash column H of each record as an argument and the relevant entry of the bitmap B2(6) is read using such hash value as the address.

(d) When the entry of bitmap B2 is 0, only one record having the relevant hash value exists in the relevant entry. Therefore, there is no possibility for existence of the other records having the value of the same grouping column as the grouping column of such record. Accordingly, since it can be understood that the record belonging to the same group as the relevant record is now being processed, the integrating process (8) is performed for the columns of the aggregation object in the data of the record held on the working area of the main memory and the result of such integrating process is output as the aggregating process result data for the group including the relevant record. Here, the aggregation column as the object of the aggregating process is defined as F={f1, ..., fm}. Namely, the aggregating process is generally composed of a plurality of processes to be performed for each column of a plurality of aggregation columns.

(e) Meanwhile, when the entry of B2 is 1, it can be understood that there are two or more records having the relevant hash values in the relevant entry. Accordingly, the relevant record is defined as the input of the conventional grouping process (13). In the ordinary grouping process, the grouping method of the existing merge sort is applied. However, it is also possible to apply the other method such as the method based on the hash functions.

Figure 4:
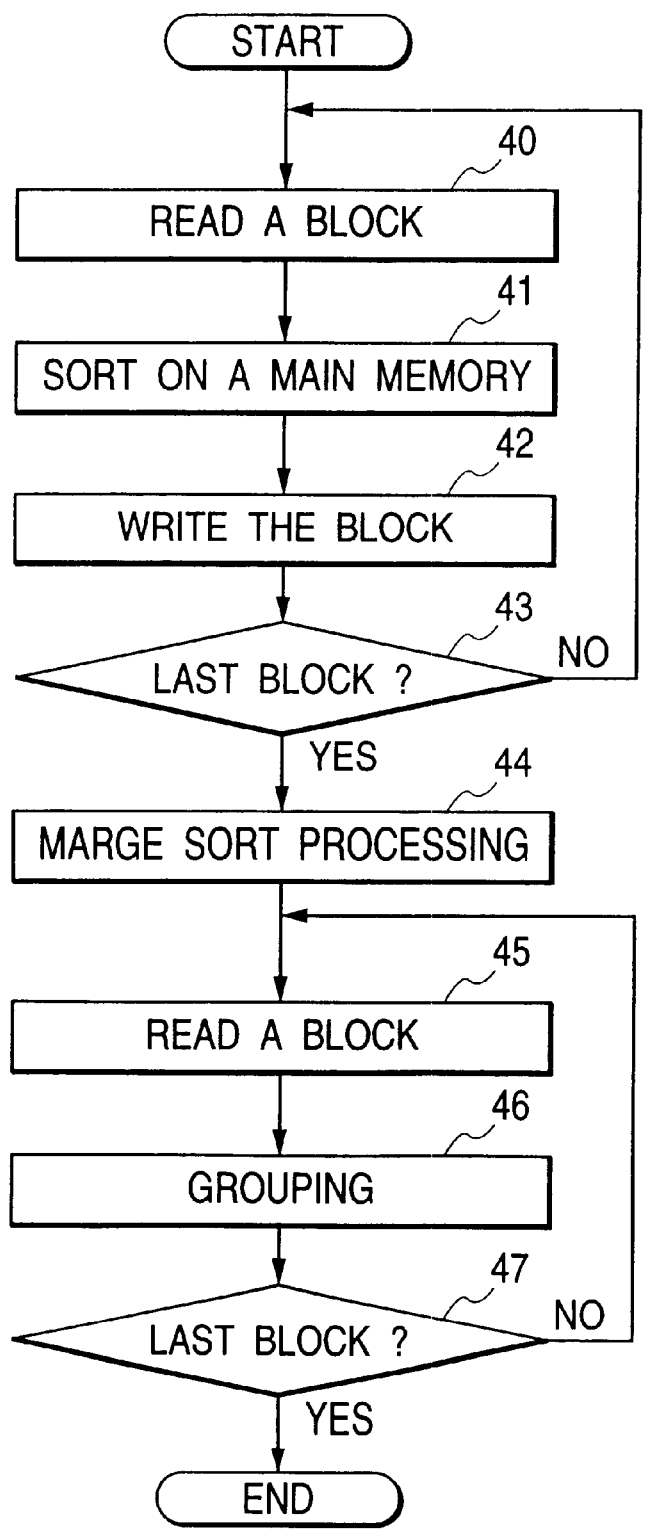
FIG. 4 is a flow chart of the existing grouping process using the merge sort method.
Figure 5:
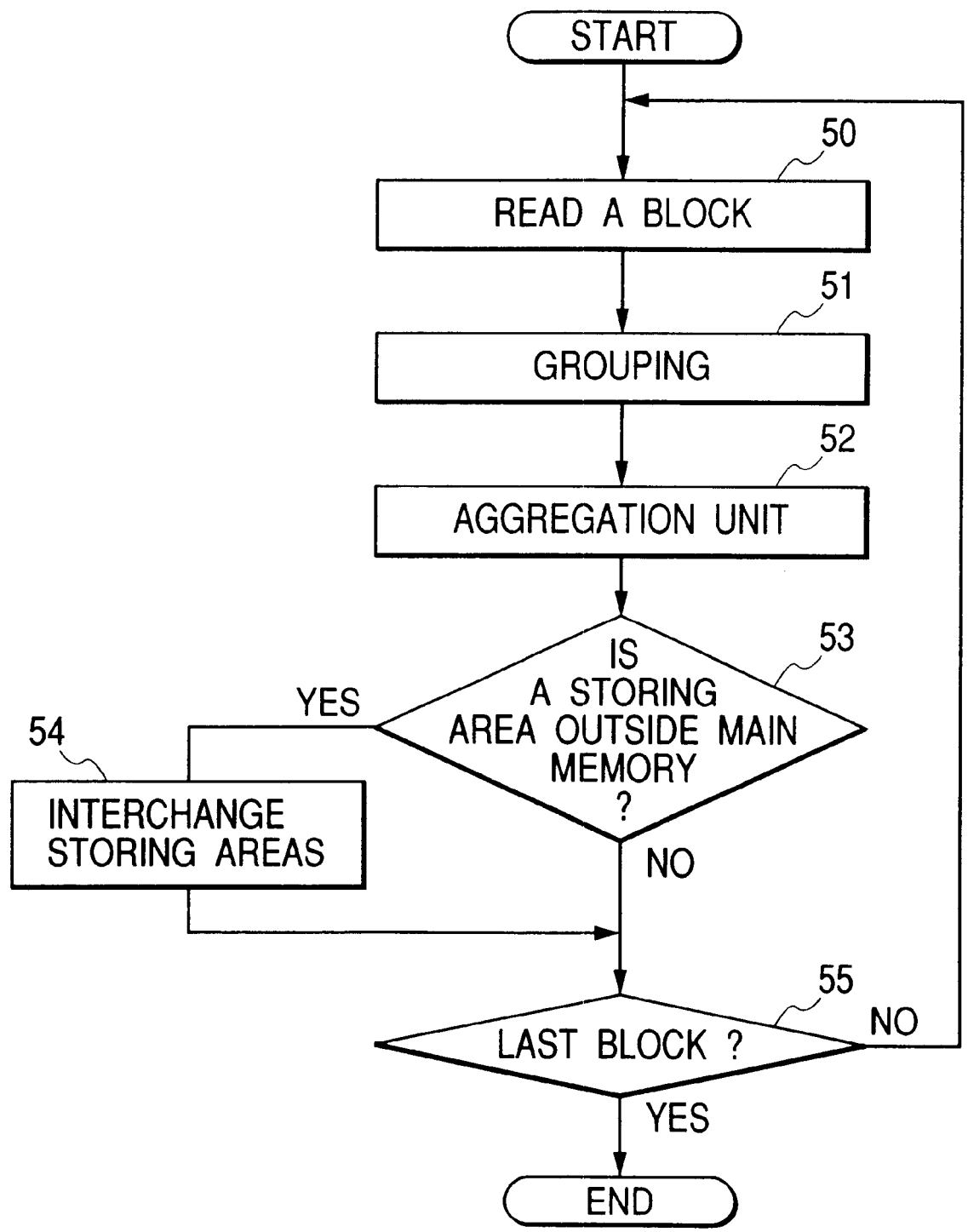
FIG. 5 is a flow chart of the existing grouping process using the hash functions.

In the grouping method based on the sort merge, the input record list in which the record forming the group is eliminated in one record is merge-sorted (10) with the column (grouping column) to be used for the grouping and the sorted record list (11) is generated on the external memory. Next, aggregating process for each group is executed by the sort-based grouping process (12) and the result of this process is output. The process after the step 7 is executed in the same manner as the existing process illustrated in FIG. 4.

In this embodiment, number of times of appearance of entry is classified into three times of 0, 1 and 2 using the bitmaps B1 and B2 for the purpose of management. Namely, contents and number of times of appearance of each bitmap are as follows.

| No. of times of Appearance | B1 | B2 |
|---|---|---|
| 0 | 0 | 0 |
| 1 | 1 | 0 |
| 2 or more | 1 | 1 |

Figure 2:
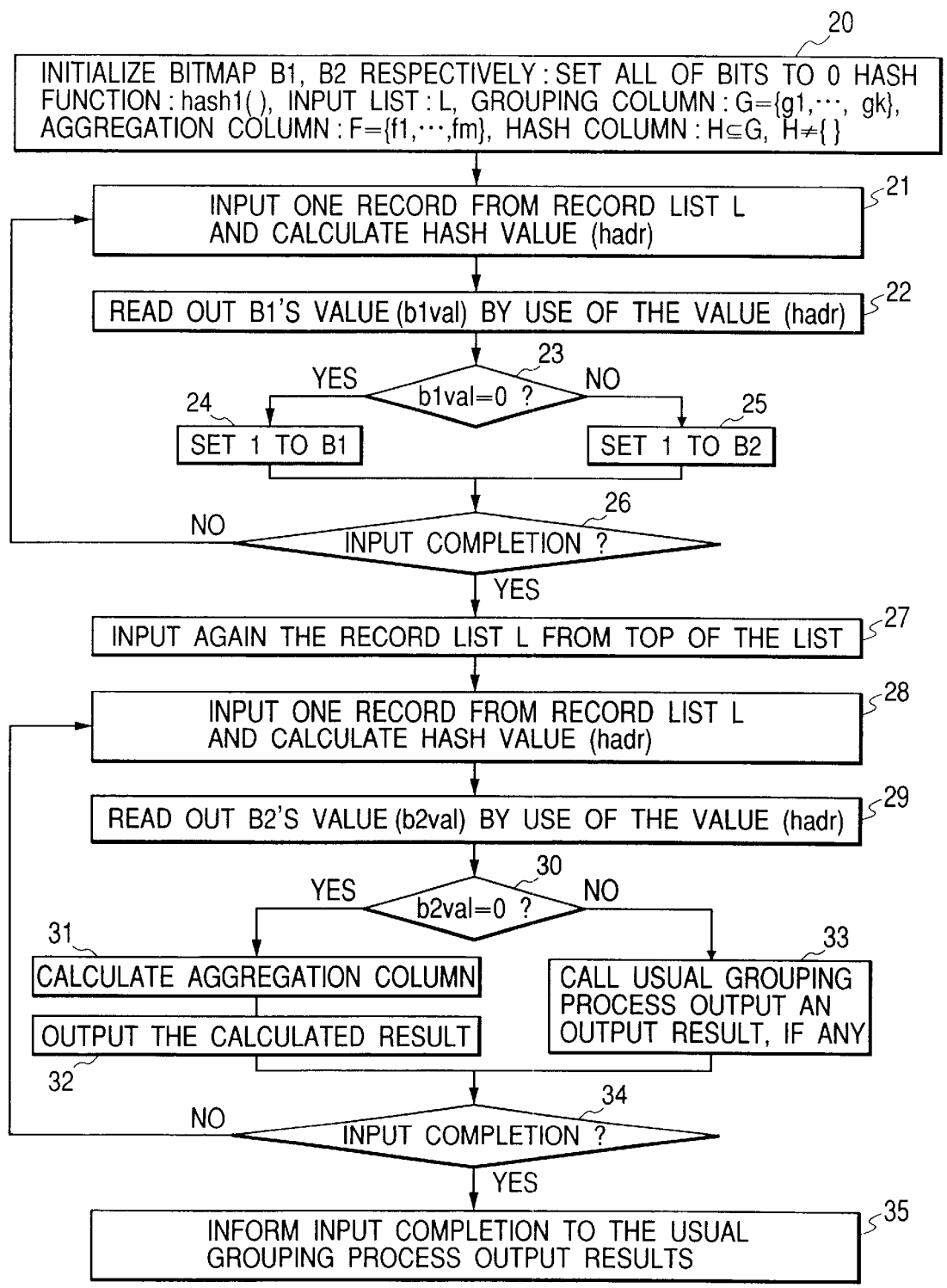
FIG. 2 is a flow chart of the grouping process illustrated in FIG. 1.

FIG. 2 illustrates the detail flow of the grouping process using the bitmap of the present invention. First, the areas of bitmaps B1, B2 are acquired on the working area of the main memory and the bit of each entry is initialized to 0 (20). The number of entries of bitmaps B1, B2 is set to the identical number and the number of entries larger than ½ of the number of records of the record list L(1) is registered. It is because if the number of entries is under ½ of the number of records of record list L, even when the average grouping duplicate degree is 1 and the hash value for the hash column H is uniformly distributed, the average duplicate degree of hash value becomes equal to 2 and it is impossible to expect the high speed operation in the present invention. In view of raising the efficiency, it is desirable to realize the number of entries of bitmaps B1, B2 which is larger than 1.4 times the number of records of the input record list L, considering the synonym of the hash value. Moreover, the has function hash1( ) is set conforming to the number of entries of the reserved bitmap.

Next, plural records in the record list L to be processed is sequentially read to the working area in the main memory from the external memory. When one row (record) is read, hash value hadr is obtained (21). A value of the relevant entry of the bitmap B1 is read with the hash value hadr. The read out value is defined as b1val (22). Next, it is determined whether the value b1val is 0 or not (23). If the value is 0, 1 is set to the relevant entry bit of the bitmap B1 (24). If not, 1 is set to the relevant entry bit of the bitmap B2. The processes of the steps from (21) to (25) are repeated until the record list is completed (26).

After above process is executed for all record lists L, all records in the record list L is sequentially read again from the beginning to the working area in the main memory from the external memory (27). When one row (record) is read, the hash value hadr is obtained again using the hash function for such row (record)(28). If it is possible in the step 21 that the hash value hadr generated for this record can be stored in the main memory or the like and it may be used again, it is no longer required to generate gain the hash value hadr in the step 28 and the stored value may be used again. Next, the relevant entry of the bitmap B2 can be read with the hash value hadr. The read out value is defined as b2val (29). Next, it is determined whether the value b2val is 0 or not (30). If the value is 0, there is no other records belonging to the same group as the relevant record. Therefore, the calculating process of the aggregation column F={f1, . . . , fm} (31) and the result of calculation is output as the aggregating process result for the group including such record (32). If not, the relevant record is defined as the input of the conventional grouping process. Namely, the relevant record is transferred for the conventional grouping process and when there is an output record of the grouping process, it is output as a result of the grouping process (33). The processes of the processes up to (33) from (28) are repeated until the input list is completed (34).

Finally, end of input is notified for the conventional grouping process and the aggregation result given from the grouping process is output in combination with the output result as the result of grouping.

FIG. 3 illustrates an example of the aggregation function converting table 39 to be used for the aggregation column calculating process of the grouping process explained above. The aggregation column calculating process is executed in the step 31 when only one record belonging to the group exists. If not, such process is executed in the conventional grouping process called in the step 33. Namely, the aggregation column calculating process is executed for the values of functions designated by user for the grouping process in regard to aggregation columns of each group. Here, as described in the left column of the aggregation function converting table 39, it is assumed that the aggregation column calculating process is composed of the processes to be executed for each aggregation column of each group in regard to the function SUM for obtaining a total, function MAX for obtaining the maximum value, function MIN for obtaining the minimum value, function AVG for obtaining the average value and function COUNT for obtaining the number of records. In the step 31, as the value of the other functions than the function COUNT in the aggregation function converting table 39, a value of each aggregation column C1 is output in direct as the value of function for the aggregation column as described in the right column of the aggregation function converting table 39 and as the value of function COUNT for obtaining the number of records sorted to respective groups, constant 0 is output when the value of aggregation column C1 is Null or constant 1 is output when it is not Null, as the value of the function COUNT for obtaining the number of records having the value effective for the aggregation column C1 among the records sorted to respective groups, moreover the constant 1 is output when it is requested to output the number of records of groups not depending on the query in which the value of aggregation column C1 is 0 or not. Accordingly, a value of the aggregation function designated by a user for the grouping process can be determined briefly without calculation for the group including only one record extracted as explained above. As the aggregation functions, various kinds of aggregation functions such as the function for obtaining the square sum and the function for obtaining square mean value can be applied in addition to such functions. When the aggregation function is the function for obtaining square sum, a value of the aggregation function must be calculated for the group including only one record extracted as explained above. However, in the case of the aggregation function for obtaining the square sum, if the number of records in the group is only one, it is enough to calculate the square of the data belonging to the aggregation columns among the data of this record and its value can be calculated easily. In the case where the function for obtaining the square mean value is used as the aggregation function, if the number of records in the group is only one, a value of the data belonging to the aggregation column among the data of such record is output in direct.

In the record list of which average group duplicate degree is almost equal to 1, a greater part of group includes only one record and the number of other groups is extremely small. When the grouping process of this embodiment is applied to such record list, the groups including only one record are previously detected and the aggregating calculation for these groups can be executed briefly. Here, it is enough to execute the conventional grouping process (for example, grouping process by the merge sort method or grouping method by the hash function) only for extremely small amount of groups other than above groups. In order to determine whether the average group duplicate degree of a certain record list is almost equal to 1 or not, the predetermined value which is almost equal to 1 is previously determined and it is requested to determine whether the average group duplicate degree of the record list is equal to the predetermined value or less. This predetermined value may be set, for example, to 1.2. In more preferable, it is requested to determine the predetermined value with the computer system or database system to which the grouping process of the present embodiment is actually applied. Namely, in order to determine whether the average duplicate degree of a certain record list is almost equal to 1 or not, it is enough to previously determine the predetermined value almost equal to 1 to determine whether the average group duplicate degree of the record list is equal to such predetermined value or less or under the predetermined value. This predetermined value may be set, for example, to 1.2. In more preferable, it is requested to determine the predetermined value with the computer system or database system to which the grouping process of the present embodiment is actually applied. Namely, it is enough that it is evaluated for a plurality of record lists having different group duplicate degree whether the grouping process may be executed at a higher speed when the grouping process of the present embodiment is applied or not and the maximum value or the value near to the maximum value of the group duplicate degree which assures high speed grouping process by the present embodiment is set to such predetermined value.

In this embodiment, the record list as a whole must be read twice to the working area of the main memory from the external memory. However, the number of groups to which the conventional grouping process must be executed can rather be reduced in comparison with increase of the processing time and thereby the effect assured by reduction of processing time is increased and thereby the time required for the groping process for the record list as a whole can be reduced remarkably. This effect is more distinctive when the average group duplicate degree of the record list to be processed is nearer to 1.

Modification Example of the First Embodiment (1) In above explanation, it is assumed that the grouping process is executed with a computer having only one processor and therefore each process is sequentially executed. However, in the computer having a plurality of processors and an external memory which is used in common by such processors, the grouping process can be executed at a higher speed. Namely, the processing time can further be curtailed by executing the record list read operation (steps 21, 28 (FIG. 2)), bitmap access (steps 22, 24, 25, 28) and conventional grouping process like those for the pipeline using a plurality of processors explained above. However, the overlap processing cannot be done for the steps 21 to 26 and steps 27 to 34 in FIG. 2. Namely, the step 27 must be activated after the processes of the steps 21 to 26 are completed.

(2) Moreover, the grouping process can be executed at a higher speed in the computer like a parallel database machine including a plurality of processors and external memories associated to each processor. In other words, the record list is divided to a plurality of partial record lists in unit of record, a plurality of partial record lists are assigned to a plurality of different processors and the records assigned to respective processors are stored to the secondary memories associated with respective processors. The record list explained above is classified into a plurality of partial record lists. Here, it is enough that respective partial record lists are processed in parallel with a plurality of processors.

In this case, it is preferable, for division of the record list, to determine the processor for assigning each record so that plural records having the equal hash value are stored in the external memories based on the hash value for the hash column for each record and process is executed by the same processor. In this case, respective processors may be applied to the partial record lists to which the processes are assigned independent of the other processors.

In other cases, it is preferable that the process is applied after each record is re-distributed so that plural records having the same hash value are assigned to the same processor based on the hash value for the hash column of each record after each record is once assigned to any processor (after each record is stored to the secondary memory belonging to such processor). Details of the optimizing method of the grouping process when the records are divided horizontally will be explained later with reference to FIG. 10.

(3) In the present embodiment, the number of times of appearance of each hash value is classified into three values of 0, 1, 2 using the bitmaps B1 and B2 for the purpose of management. Namely, when the number of different values which the hash value for the hash column can take is assumed as n, total capacity of the two bitmaps B1, B2 becomes 2 n bits. However, it is actually redundant to administrate three conditions with two bits and capacity of the area in the necessary main memories becomes large. Therefore, for example, when the natural number k which results in that, $3^n$ is smaller than $2^{2k}$ ($3n<2^{2k}$ and n is larger than k (n>k) can be selected, the number of times of appearance of each hash value can be administrated using the smaller area within the main memory. In other words, the natural numbers $0 \times 3^i$, $1 \times 3^i$, $2 \times 3^i$ are assigned respectively to the conditions of the number of times of appearance of i-th hash value, and the total sum of natural numbers assigned to all hash values is expressed by a binary number. Namely, the number of times of appearance of each hash value is expressed one digit of ternary number and the number expressed by such ternary number is expressed by the binary number. The total value is smaller than $3^n$ and total value becomes smaller than $2^{2k}$ depending on the condition. Accordingly, it is understood that the binary number is enough to have 2 k bits in order to express the total value with a binary number. Therefore, it can be understood that such number of bits is smaller than the total capacity of 2 n bits of a couple of bitmaps B1, B2.

In more practical, the storing area of the condition data of 2 k bits is reserved on the main memory and its initial value is set to 0. After the hash value is obtained in the step 21 of FIG. 2, following processes are executed in place of the steps 23 to 25 of FIG. 2. The hash value obtained is defined as the i-th hash value which the hash function can take. When the number of times of appearance in the past of the i-th hash value is 0 and 1, the condition data explained above is updated and when the number of times of appearance in the past is 2, such condition data is never updated as in the case of the bitmap. Namely, when the number of times of appearance of the i-th hash value reaches 2, if the i-th hash value appears later, the condition data is never updated. Accordingly, before the condition data is updated, the number of times of appearance of the i-th hash value in the past is calculated from the condition data. Therefore, the condition data is divided with a binary number expressing the natural number $3^i$ and the obtained remainder is then divided with 3. When the remainders obtained are 0, 1, 2, the number of times of appearance of the i-th hash value in the past becomes 0, 1 or 2 or more. When the number of times of appearance of the i-th hash value in the past is 0 or 1, the binary number expressing the natural number $3^i$ is added to the condition data in order to update the condition data. The value to be added is identical even when the number of times of appearance in the past is 0 or 1. When the number of times of appearance of the i-th hash value in the past is 2 or more, the condition data is never updated.

Following processes are executed in place of the steps 29, 30 of FIG. 2. It is determined whether the number of times of appearance of hash value obtained in the step 28 is 1 or not (namely, 2 or more). Method of this determination is explained above. When the number of times of appearance is 1, process goes to the step 31. When the number of times of appearance is 2 or more, process goes to the step 33. For example, when n=5, k=4, the result obtained becomes $3^5=243$, $2^{(2\times 4)}=256$. This result satisfies the above conditions. It is now possible to execute management of the three classifications of number of times of appearance for each value of five hash values with the binary number of 8 bits by using such combination. In the case of management of three classifications of number of times of appearance simply for one hash value with two bits, it is possible to execute management of only four entries with eight bits, but in the case of this modification, the area on the main memory used for condition management can be saved by 20%. However, the division explained above must be done to determine the classification of the number of times of appearance for each hash value and a longer time is therefore required than that required when the bitmap is used. However, such determination can also be done at a high speed in the computer comprising the arithmetic unit which can realize such division at a higher speed.

Second Embodiment of the Invention

Figure 6:
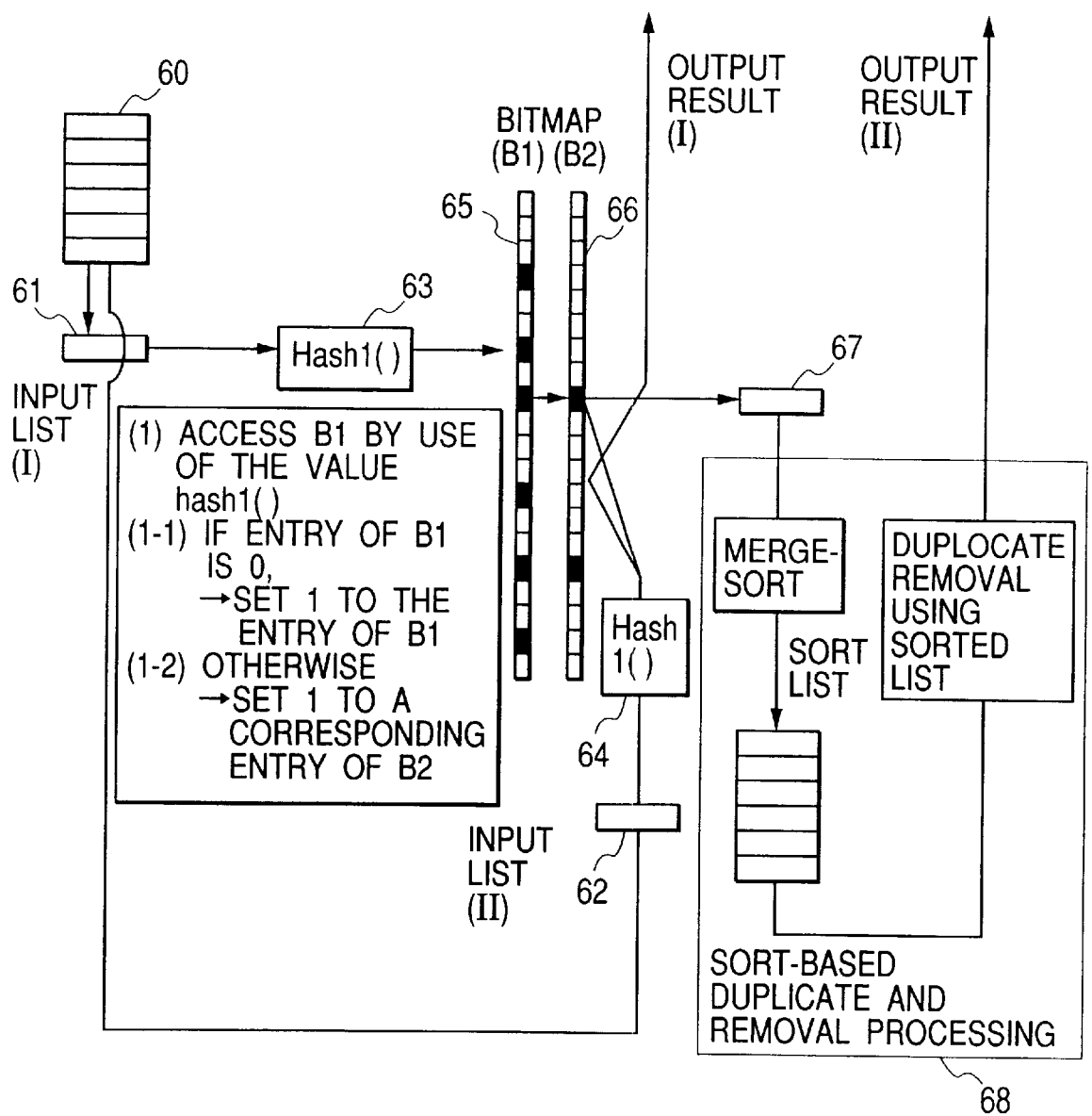
FIG. 6 illustrates a summary of the duplicate removal process in the present invention using the hash functions.

Next, the duplicate removal method of the present invention will be explained. FIG. 6 is a schematic diagram of an embodiment of the duplicate removal process of the present invention. Processing sequence will be explained below.

(a) Here, it is assumed that the record list 6 is detected as a result of query from a user to the database. This record list is also assumed to be stored in the external memory. All records in the record in this record list 1 are sequentially read on the main memory from the external memory. A hash value is generated (63) for each record with the hash1( ) function using, as the argument, the hash column H which is the non-vacant partial aggregation (namely, consisting of one or a plurality of columns selected from a plurality of columns) of a plurality of columns forming the list. The argument of the hash function hash1( ) is assumed as the non-vacant partial aggregation $H \subseteq C$, $H \neq \{ \}$ of the structural column C={c1, . . . , ck} of the list. The hash function hash1( ) is predetermined to take a less number of hash values than total number of values which the hash column H can take. Reference is made to the relevant entry of the bitmap B1(65) using this hash value as the address.

(b) When an entry of the bitmap B1 is 0, bit of the relevant entry is set to 1. When the entry of bitmap B1 is already set to 1, the corresponding entry of the bitmap B2(66) is set to 1. The bitmap B2 also has the size identical to that of the bitmap B1 and each bit storing area corresponds to one bit storing area in the bit map B1. Above process is repeated for all records. If entry of bitmap B2 is 0 as a result of above process, it can be understood that there is only one record corresponding to the relevant entry. When the entry of the bitmap B2 is set to 1, there are plural records having the hash value corresponding to the relevant entry. When the corresponding entries bitmaps B1, B2 are set to 0, the record having the hash value corresponding to the relevant entry does not exist.

(c) The record list is read again (62), hash value is generated with the hash1( ) function using as the argument the hash column H of each column and the relevant entry of the bitmap B2(66) is read using the hash value as the address.

(d) When the entry of bitmap B2 is set to 0, there is only one record having the hash value corresponding to the relevant entry. Therefore, since it can be understood that there is no possibility for existence of the other records holding the same value as the relevant records, such record is output in direct as the record after duplicate removal process.

(e) On the other hand, when the entry of the bitmap B2 is set to 1, it can be understood that there are two or more records having the relevant hash value in the relevant entry. Therefore, there is possibility for existence of the other records (duplicate records) holding the same value as such records. Accordingly, the relevant records are input (67) of the conventional duplicate removal process (68). In the conventional duplicate removal process, various methods, for example, the method based on the existing sort merge and the method based on the hash function can be applied. FIG. 6 illustrates an embodiment when the merge sort method is applied as the conventional duplicate removal method. In the merge sort method, an input list formed by the records after deleting the duplicate records is merge sorted with the list structure column C to generate the sorted list on the external memory. Next, the duplicate records are deleted by the sorted duplicate removal process for such list and the list after deletion is output.

Figure 7:
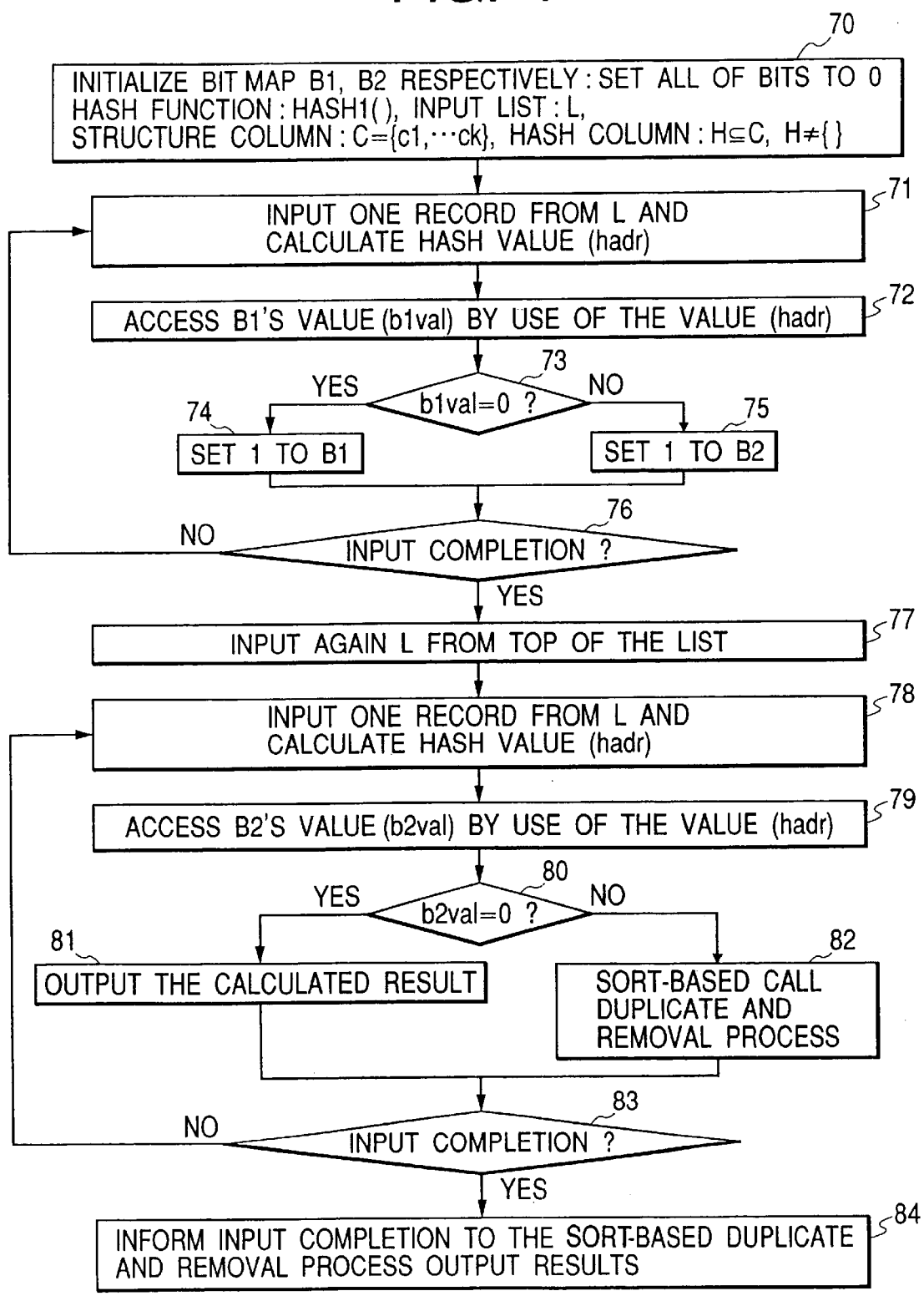
FIG. 7 is a flow chart of the duplicate removal process illustrated in FIG. 6.

FIG. 7 illustrates a detail flow of the duplicate removal process. First, the areas of bitmaps B1 and B2 are reserved on the working area of the main memory and the bit of each entry is initialized to 0 (70). The number of entries of the bitmaps B1 and B2 is identical and the number of entries larger than ½ the number of records of input list L is reserved. It is because if the number of entries is under ½ the number of input lists L, even when the record duplicate degree is 1 and the hash value is uniformly distributed, the average duplicate degree of hash value becomes 2 and it is impossible to expect high speed process by the present invention. In order to raise the efficiency, it is desirable to reserve the number of entries of the bitmaps B1, B2 larger than 1.4 times the number of records of the input list L, considering the synonym of hash value. Moreover, the hash function hash1( ) is set conforming to the number of entries of the reserved bitmap.

Next, plural records in the record list L to be processed are sequentially read into the working area in the main memory. When one record is read, the hash value hadr is obtained (71). The relevant entry value of the bitmap B1 is read with the hash value hadr. The read out value is defined as b1val (72). Next, whether the value of v1val is 0 or not is determined (73). If it is 0, 1 is set to the bit of the relevant entry of the bitmap B1 (74). If not, 1 is set to the bit of the relevant entry of the bitmap B2 (75). The process up to the steps 75 from 71 is repeated until the end of the input list (76).

After the process explained above is executed for all input lists L, all records in the input list L are read again sequentially into the working area in the main memory from the external memory (77). When one row (record) is read, the hash value hadr is obtained again using the same hash function for the row (record)(78). If hash value hadr generated for this record by the process of step 71 can be stored to the main memory and it can be used again, it is not required here to generate again the hash value and the stored value is used again. Next, the relevant entry of the bitmap B2 is read with the value of hadr. The read out value is defined as b2val (79). Next, whether the value of b2val is 0 or not (80) is determined. If the value is 0, since there is no other records having the value identical to that of the relevant record, only one record among the records explained above is output as a result of the duplicate removal process (81). If not, the relevant records are input to the conventional duplicate removal process. Namely, the conventional duplicate removal process using, for example, the merge sort method or hash table is called with the relevant record as the argument and when there is an output record of the duplicate removal process, it is output as the result of the duplicate removal process (82). The process up to the steps 82 from 78 is repeated until the end of the input list (83).

Finally, input end is notified to the conventional duplicate removal process and a list after the duplicate removal process to be output later from the conventional duplicate removal process is then output (84).

Even in the case of executing the duplicate removal process, it is often detected that almost there is no duplicate list L. Namely, the average record duplicate degree is almost equal to 1. Therefore, the number of records in the list as the object of the conventional duplicate removal process can be saved remarkably and it is now possible to execute the high speed conventional duplicate removal process. Accordingly, it is desirable that whether the average record duplicate degree of record list in the database has the value near to 1 or not before execution of the duplicate removal method and when the record duplicate degree of record list has a value near to 1, the above duplicate removal method is executed. Whether the average record duplicate degree of the record list is near to 1 or not can be determined by determining previously the predetermined value which is near to 1 and then determining whether the average record duplicate degree of such record list is equal to, less than or under the predetermined value. Here, a constant value may be used as the predetermined value but, in more preferable, such predetermined value is determined by the computer system or database system to which the duplicate removal process of the present embodiment is actually applied as in the case of the predetermined value for the grouping process explained previously.

Figure 9:
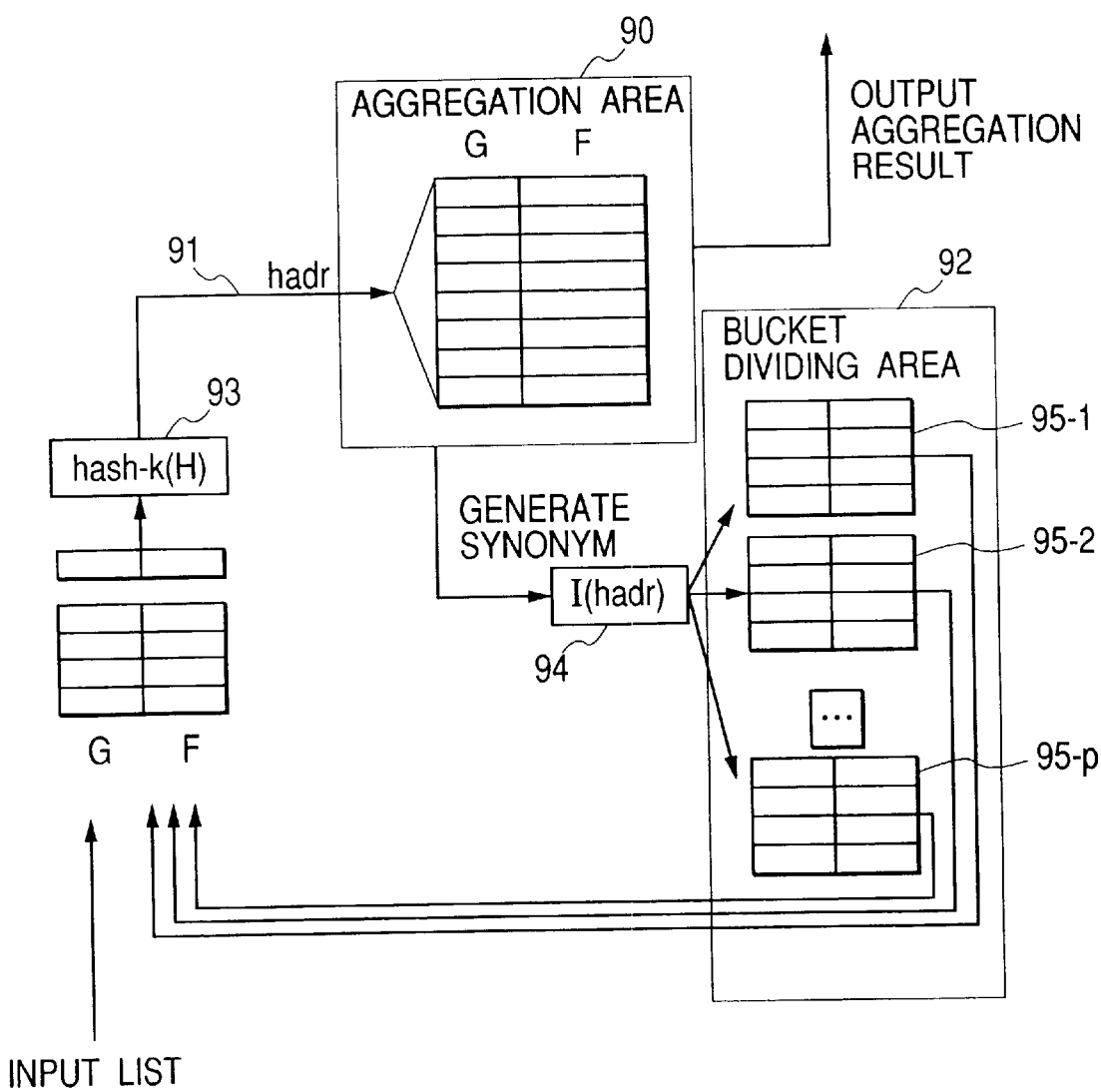
FIG. 9 is a flowchart of the grouping process in the present invention using the merge sort method.

The duplicate removal process is equivalent to the special grouping process in which all structural columns of list L are defined as the grouped columns and the aggregation columns are not provided. The hybrid hash grouping method which may be applied when the average group duplicate degree to be explained later using FIG. 9 is 2 or higher and the optimizing method of the grouping process in the parallel database can also be applied to the duplicate removal process by equivalently converting the duplicate removal process to the special grouping process as explained above.

FIG. 8 is an example of the query for explaining the effect of the present invention. This query executes the process corresponding to Q_16 of the TPC-D bench mark which is known as the bench mark of the database.

This query is executed by the sequence explained below.

(a) The PART table is squeezed by the following single table selecting condition.
P_BRAND<>'Brand#45' and P_TYPE NOT LIKE 'MEDIUM PLISHED%' and P_SIZE IN (49, 14, 23, 45, 19, 3, 36, 9)

The PART table obtained by such process is coupled with the PARTSUPP table using PARTKEY as a key. Thereafter, the table is squeezed by the NOT IN condition. As a result, the table of about SF×120 k records can be obtained. SF means a scale factor and 1k records means the 1000 records.

(b) The duplicate removal process is executed in the column of {P_BRAND, P_TYPE, P_SIZE, P_SUPPKEY}. The result is about SF×120 k records. Namely, since the average record duplicate degree is extremely near to 1, the number of records is not almost reduced even after the duplicate removal process.

(c) The grouping is conducted in the column of {P_BRAND, P_TYPE, p_SIZE} to count up the number of records of each group.

Among a series of these processes, the number of duplicate records which are actually deleted in the duplicate removal process of (b) is several tens of records when SF=1. For example, when about SF*1M bits of entries of the bitmaps B1, B2 are obtained, synonym by the hash value is almost not generated and 1 is set to the bitmap B2 only in the several tens of duplicate records. Therefore, it is enough to execute the ordinary duplicate removal process only for the data of these several tens of records and the other records are immediately output as a result at the time of second scan process. Therefore, the required for duplicate removal process is reduced outstandingly. When scale factor SF=1, the required total sum of the capacity of the bitmaps B1 and B2 is about 256 KB and it can be reserved on the main memory. Moreover, even when the scale factor SF becomes large, if a plurality of units of the processors are provided, capacity of the bitmap to be reserved in one unit can be reduced by re-distributing the input list for these processors based on the hash value of the structural column as in the case of explanation about the modification of the first embodiment. In addition, when it is possible to use the main memory in common among a plurality of processors, this method can be applied even when the scale factor SF becomes large by generating one large bitmap on these main memories used in common.

Third Embodiment of the Invention

FIG. 9 illustrates the processing flow of the grouping method suitable for the efficient grouping of the record list having the average duplicate degree of 2 or higher. In this embodiment, the aggregating area 90 is previously reserved on the main memory. The aggregating area 90 is composed of the G field for holding a value of the respective grouping columns G=(g1, . . . , gk) of plural records and the F field for holding the aggregation result for the aggregation columns F={f1, . . . , fm} and access is made to each entry by each value hadr of a plurality of hash functions hash-k( ) (k=1, 2, 3, . . . , m) of the hash columns H⊆, H≠{ } which becomes the non-vacant partial aggregation of the grouping column G={gl, . . . , gk}. Each hash function hash-ko (k=1, 2, 3, . . . , or m) is previously determined to become an independent function using a value of the hash H⊆, H≠{ } which will become the non-vacant partial aggregation of the grouping column G. (Here, "hash function g is independent for the hash function f" means that g(x)=g(y) cannot be obtained if f(x)=f(y) for all values x, y of the defined area".

For example, three values a, b, c (a, b>c) which are in the prime relationship are prepared and f(x)=(x mod a) mod c, g(x)=(x mod b) mod c are defined.) Meanwhile, the records not accommodated in the aggregating area 90 are divided into a plurality of buckets and a bucket dividing area 92 for accumulating respective buckets as the temporary lists is prepared on the external memory. Moreover, the area for temporarily holding the records to be stored in the bucket dividing area 92 is also reserved on the working area of the main memory. In this embodiment, the function f for bucket division for simplification uses the previously obtained hadr as the argument. However, it is also possible to use a plurality of independent hash functions using the non-vacant partial aggregation of the grouping column G as the argument for the function f as in the case of the hash functions.

Flow of the grouping process of this embodiment is as follow.

First, all records in the record list to be grouped are sequentially read on the main memory from the external memory. For one record (input record) of the input list, the hash value hadr is obtained (93) with the first hash function hash-1( ) and the entry of the aggregating area 90 is retrieved (91). When the entry of the aggregating area for the hash value hadr is vacant, the grouping column G of this record is registered to the G field of the aggregating area 90 and the aggregation result data (it is generally composed of a plurality of function values) for such group is calculated and then registered to the F field under the assumption that the group to which such record belongs is composed only of such record. When the entry of the aggregating area 90 for the hash value hadr is not vacant and a value of the G field of the relevant entry is matched with a value of the grouping column of the input record, the relevant input record can be determined to belong to the same group as the record registered to the entry. In this case, a new aggregation result data for such group can be calculated using a value of the aggregating field F of such entry and the aggregation column of input record and the aggregation result data in the aggregating field F of such entry is replaced. When the entry of the aggregating area 90 is not vacant and a value of the G field of the relevant entry is different from a value of the grouping column of the input record, it is determined that synonym by the hash function is generated. In this case, a value f(hadr) of the function f for dividing the bucket for the hash value hadr is calculated (94), one of the buckets 95-1, 95-2, . . . , 95-p in the bucket dividing area 92 is selected depending on such value and the input record is temporarily stored in the bucket as the record not grouped and then it is output to the external memory as a temporary list of the relevant bucket. However, the entire part of each record is never stored in the bucket but the grouping column and aggregating column of each record are stored. In the following explanation, each record is stored in some cases for the purpose of simplifying the explanation.

However, the temporary list is output later to the external memory at a time using the sequential access method. Namely, when such input record is temporarily stored in the working area of the main memory and the other record having the identical function value f(hadr) is processed later, the subsequent records are stored in the storing position following the storing position of the input record in the working area of the main memory. As explained above, when plural records having the identical function value f(hadr) are stored in the working area, such records are transferred at a time to the external memory as the temporary list for the function value using the sequential access. When plural records having the identical function value f(hadr) are further processed later, such records are stored temporarily in the working area and then transferred to the external memory in the same manner. The newly transferred temporary list is administrated as the temporary list of the record having the identical function value f(hadr) combined with the temporary list transferred previously to the external memory having the identical function value f(hadr). This is also true to the other records having the other function value f(hadr). Therefore, it is no longer necessary to reserve the area for storing all records having the identical function value f(hadr) on the working area of the main memory. In addition, since plural records having the identical function value f(hadr) are transferred at a time to the external memory, random access for the external memory is never generated. Therefore, transfer of the temporary file to the external memory from the main memory can be realized at a high speed in comparison with the transfer of each record in the temporary list to the external memory each time when it is generated. In such a stage that the process of all input lists is completed, each entry of the aggregating area 90 stores the data for one group having the identical value of grouping column. Namely, in the G field, a value of the grouping column common to one or plural records belonging to such group is stored and in the G field, the aggregation result data for one or plural records is stored. Accordingly, the data of G and F fields of each entry is output as a result of the grouping process. Thereafter, all data in the aggregating area 90 are invalidated.

Next, when a non-vacant temporary list exists in the bucket dividing area 92, the temporary list, for example, 95-1 is used again as the input list and the process similar to that explained above is executed in the repeatable manner by changing the hash function. Here, k of the hash function hash-k is set to become identical to (number of times of re-division of the relevant input list+1) and the subscript is increased one by one for each repetition of the process. During the process for this temporary list, the records which satisfy the condition identical to that explained above among plural records included in the temporary list are newly registered to the aggregating area 90. Moreover, for the records which do not satisfy this condition are defined as the divided buckets, a new bucket dividing area is additionally prepared and such above records are stored in the area depending on the hash value used within the bucket dividing area 92. The process for this temporary list is repeated until all records of temporary list are aggregated in the aggregating area 90 and any overflow is no longer generated.

When non-vacant other temporary list generated by the process in which the first hash function hash-a is used exists in the other bucket dividing area 92, the process is also repeated in the same manner as explained above for the other temporary lists. As explained above, above processes are repeated by changing the hash function until the temporary lists of all buckets become vacant. When the temporary list becomes vacant, it means that all records are grouped. This system is called, hereinafter, as the hybrid hash grouping process (HHGB).

According to this method, the grouping process by the hash system can be executed using the aggregating area 90 working area for temporarily storing a part of the divided bucket. Therefore, it is no longer required to reserve, on the main memory, the large hash table area used for the grouping process by the existing hash system. Moreover, in the grouping process by the existing hash system, random access is generated to the external memory when the size of hash table area is limited or when the number of groups increases, but in this embodiment, a small size area may be used on the main memory and in addition access to the external memory can be realized through the sequential access to reduce the access time to the external memory. Moreover, when the number of groups is small, since the synonym is never generated for the aggregating area 90, access to the external memory is unnecessary and the grouping process may be done by the pipeline process. In other words, calculation of hash function value, reading of aggregating area 90 by this calculation and update of data in the aggregating area 90 depending on such result may be executed for the records which have been read, in parallel to the subsequent read operation of the input list from the external memory.

Fourth Embodiment of the Invention

The further improved high speed processing method in the grouping process has been explained for the cases where the average group duplicate degree is near to 1 and it is 2 or larger. Next, a method for optimizing the grouping process for applying, in the optimum manner, these system in the parallel database system in which the data are divided and stored in horizontal in unit of record will then be explained below.

FIG. 10 illustrates the system for optimizing the grouping process for the parallel database. Here, the parallel database system is formed of a plurality of computers and a plurality of external memories associated with respective computers. The record table (or record list) of database is divided in unit of record into a plurality of partial record tables (or divided lists) as a result. A plurality of partial record tables are then discretely stored in a plurality of external memories. The basic program executed by these computers (hereinafter referred to as processing unit) is assumed to be composed of the program shared for acceptance of query, response of result and query process (hereinafter referred to as front end server (FES)) and the program for requesting access and query to the database (hereinafter referred to as back end server (BES)). The front end server FES is executed on at least one computer, while back end server BES on each machine of a plurality of computers. The back end server can also be executed even on the computer for executing the front end server. The front end server may also be mounted on each computer. The front end server loaded to any computer accepts the query and requests the execution of process required by this query to a plurality of back end servers loaded to the relevant computer and the other computers. Each back end server executes its process in parallel with the execution of process by the other back end server for the partial data (partial record table) of the database stored in the external memory associated with the computer in which such back end server is loaded. Each back end server notifies the processing result to the front end server and this front end server summarizes the processing results notified from respective back end servers to generate response to the query and transfers this response to the program which has issued the query. In this embodiment, the optimizing method is applied when this query includes the grouping process. However, this optimizing method can also be applied, even if in other system structure, in the same manner when the record table of database is divided in unit of record into a plurality of partial record tables as a result and such partial record tables are then discretely stored to a plurality of external memories.

First, the optimizing method is different depending on the condition whether the grouping column (described as grouping key in the figure) includes the data dividing key or not, because it is assured that the same group always belongs to the same divided list when the grouping column includes the data dividing key. Therefore, the divided list is generated in such a manner. In this case, when the grouping process is executed in the respective divided lists, it means that the grouping process of the data as a whole has been conducted. On the other hand, if the grouping column doses not include the data dividing key, the grouping process must be repeated between the divided lists because the records belonging to the same group are discretely stored in a plurality of divided lists. When the number of groups is defined as g, the total number of records of the input list as L and the number of divisions as n, the average group duplicate degree of the parallel database becomes L/g in such a case that the grouping column includes the dividing key or becomes L/g/n in such a case that the grouping column does not include the dividing key.

Moreover, after the back end server has completed the grouping process, the processing methods from G1 to G9 are selected depending on whether the processing unit to be executed next is the front end server or back end server, or on whether the input list is already sorted or not by the grouping unique key or on the value of the average group duplicate degree. Here, the grouping unique key means the partial aggregation column of the grouping key and aggregation of columns in which the group in the grouping process is uniquely determined when a value of the grouping key is determined uniquely. Namely, the grouping unique key means aggregation of columns in which the grouping columns are subjected to the functions. The grouping column itself certainly becomes the grouping unique key. In addition, when the unique key of the relevant list is included in the grouping column, the relevant unique key becomes the grouping unique key.

The practical optimizing method will be explained with reference to FIG. 10.

(1) When the grouping column includes the dividing key;

(1.1) When the next process is executed by the front end server;

In this case, the next process is, for example, the merge process.

(1.1.1) When the input list is already sorted by the grouping unique key;

Each back end server executes the corresponding divided sort-based grouping process and transmits the result to the front end server. The front end server receives in parallel the result transmitted from each back end server (hereinafter, this operation is called the P-SCAN) and outputs this result (G1).

(1.1.2) When the input list is not sorted by the grouping unique key;

(1.1.2.1) If group duplicate degree is a little larger than 1 (for example, larger than 1.2) or when the aggregation area of all records can be reserved at a time on the main memory;

Each back end server executes the HHGB process and respectively outputs the result to the front end server. The front end server receives in parallel the results transmitted from each back end server and outputs the result (G2).

(1.1.2.2) When the group duplicate degree is extremely near to 1 (for example, under 1.2) and the aggregation areas of all records are assumed not to be reserved at a time on the main memory, each back end server executes the bitmap grouping process and outputs the result to the front end server. In the bitmap grouping process, the HHGB process is applied only to the records of which duplicate degree is determined as 2 or larger. The front end server receives in parallel the result transmitted from each back end server and outputs the result (G2d).

(1.2) When the next process is executed by the back end server;

In this case, the next process is, for example, the join process to be executed before the merge process.

(1.2.1) When the input list is already sorted by the grouping unique key, the optimization is performed in the same manner as (1.1.1) (G3).

(1.2.2) When the input list is not sorted by the grouping unique key;

(1.2.2.1) If the group duplicate degree is a little larger than 1 (for example, 1.2 or larger) or when the aggregating area of all records are assumed to be reserved at a time on the main memory, each back end server executes the HHGB process and outputs the result respectively to the next back end server. The next back end server receives in parallel the result transmitted from each back end server and outputs the result (G4).

(1.2.2.2) If the group duplicate degree is extremely near to 1 (for example, under 1.2) and the aggregating areas of all records are assumed not to be reserved at a time on the main memory, each back end server executes the bitmap grouping process and respectively outputs the result to the next back end server. In the bitmap grouping processing, the HHGB process is applied only or the records of which duplicate degrees are determined as 2 or larger. The next back end server receives in parallel the result transmitted from each back end server and outputs the result (G4d).

(2) When the grouping column does not include the dividing key;

(2.1) If the next process is executed by the front end server;

(2.1.1) When the input list is already sorted by the grouping unique key, the sort-based grouping process is executed in the respective processing unit and the result is respectively transmitted to the front end server. The front end server receives in parallel the result transmitted from each back end server while it is merged by the tournament system so that it is sorted by the grouping unique key (T-SCAN) and then outputs the result after executing again the grouping by the sort-based grouping process (G5).

(2.1.2) When the input list is not sorted by the grouping unique key;

(2.1.2.1) If the group duplicate degree is considerably larger than 1 (for example, 2 or larger), each back end server executes the HHGB process and distributes again the result among the back end servers using the grouping column as the dividing key. Each back end server receives in parallel the transmitted data to apply the process using such data as the input list (1.1.2.1) (G6).

(2.1.2.2) When the group duplicate degree is about 1 (for example, under 2), the input list is distributed again among the back end servers using the grouping column as the dividing key. Each back end server receives in parallel the transmitted data and applies the process of (1.1.2.1) or (1.1.2.2) depending on the value of group duplicate degree after re-distribution using such data as the input list (G7).

(2.2) If the next process is executed by the back end server;

(2.2.1) If the group duplicate degree is considerably larger than 1 (for example, 2 or larger), each back end server executes the hybrid hash grouping process (HHGB) and distributes again the result among the back end servers using the grouping column as the dividing key. Each back end server receives in parallel the transmitted data and applies again the hybrid hash grouping process using such data as the input list.

(2.2.2) If average group duplicate degree is about 1 (for example, under 2), the input list is immediately re-distributed among the back end servers using the grouping column as the dividing key. Each back end server receives in parallel the transmitted data and applies the process of (1.2.2.1) or (1.2.2.2) depending on the value of the average group duplicate degree after the re-distribution using such data as the input list (G9).

With the optimization explained above, the grouping process can be executed in the optimum manner in the parallel database. Moreover, in regard to the duplicate removal process, the optimization explained above can also be applied, as explained above, by converting such process to the special grouping process.

According to the grouping method of the present invention for previously determining the group formed of only one record, the grouping process can be realized at a extremely higher speed when the average group duplicate degree is near to 1. In the same manner, the duplicate removal process can also be realized at a higher speed.

Moreover, according to the grouping method of the present invention using a plurality of hash functions, the high speed grouping process can also be realized even when the average group duplicate degree is not near to 1.

What is claimed is:

1. A grouping method comprising the steps of:
    determining whether there is possibility or not for existence of at least another record having the identical value of a column for grouping of the relevant record for each record by executing a predetermined first process to a value of at least a part of one or more predetermined columns for the grouping of each record of a plurality of records of a record list included in the database;
    determining respectively a part of a plurality of records which is determined, by said determination, not to have possibility for existence of other records having a value of the same grouping column as a records belonging to one group; and
    classifying, by a second process, a plurality of the other records other than a part of said records among a plurality of records of said record list into a plurality of groups so that a plurality of records having the identical value of said columns for grouping belong to the same group.

2. A grouping method according to claim 1, wherein said step of determining possibility comprises the steps of:
    generating a hash value, to each record among a plurality of records of the record list included in said database, by the hash function in which a value of at least a part of columns of one or more predetermined grouping columns of each record is used as an argument; and
    determining whether there is at least another records having the same hash value as that generated for each record or not depending on a plurality of hash values generated for a plurality of said records;
    wherein said determining step further comprises a step of determining that a plurality of partial records which are determined respectively not to allow the other records having the same hash value to exist by said determination as the records respectively belonging to one group.

3. A grouping method according to claim 2, wherein said determining step comprises the steps of:
    updating, in relation to the generated hash value, counted data for identifying, each time when said hash value is generated for each record, whether the number of records which has generated a plurality of hash value to be generated by said hash function is 0 or 1 or 2 or larger;

executing again said hash value generating step to a plurality of said records after said update is executed to a plurality of said records of said record list; and determining, based on said counted data, whether the number of records having generated the hash value generated again is 1 or not.

4. A grouping method according to claim 3, wherein said counted data includes two bits for counting whether the number of records having generated such hash value is 0 or 1 or 2 or larger corresponding to each value among a plurality of hash values which may be generated by said hash function.

5. A grouping method according to claim 3, wherein said counted data expresses the number of records 0, 1, 2 or larger having generated the hash value with the natural numbers such as $0\times(3^i)$, $1\times(3^i)$, $2\times(3^i)$ when the hash value is the i-th hash value corresponding to each value of a plurality of hash values which may be generated by said hash function and a binary number expressing the total sum of such natural numbers corresponding to a plurality of said hash values; and $3^n$ is smaller than $2^{2k}$ and n>k when the total value of a plurality of said hash values generated by said hash function is n and the number of bits of said binary number is 2 k bits.

6. A grouping method according to claim 1, further comprising a step of determining whether an average group duplicate degree of said record list is near to 1 or not, and wherein the steps after said determining step are executed when the average group duplicate degree of said record list is determined to be near to 1.

7. A grouping method according to claim 2, further comprising a step of executing an aggregating process for a group to which records belong without depending on the execution result of said classifying step on the basis of each record among a plurality of records of a part respectively determined by said determining step that there is no other records having the same hash value; and wherein the classifying step includes a step of executing the aggregating process to each group among a plurality of groups classified by the classifying step.

8. A recording medium having recorded a computer program for executing said method of claim 1 by using a computer.

9. A duplicate removal method comprising the steps of:

determining whether there is possibility or not for existence of at least another record having a value identical to that of a record by executing a predetermined first process to one or more column values of a plurality of records of a record list included in a database;

executing a second process for deleting records other than one of the duplicate records having the identical value to a plurality of records other than a plurality of partial records determined to have no possibility for existence of the other records having the same value by said determining step among a plurality of records of said record list; and a plurality of said partial records and a plurality of said records after said deletion are output as the records after duplicate removal.

10. A duplicate removal method according to claim 9, wherein said determining step for possibility comprises the steps of:

generating a hash value with the hash function using the values of one or more columns of a record as the argument to each record among a plurality of records of the record list included in the database;

determining whether at least another record having the same hash value as that generated for each record exists or not depending on a plurality of hash values generated for a plurality of said records; and determining a plurality of partial records, among a plurality of records of said record list, determined by said determining step that there is no other records having the identical hash value as the records having no possibility for existence of the other records having the identical value.

11. A duplicate removal method according to claim 10, wherein said determining step comprising the steps of:

updating, in relation to the generated hash value, counted data for identifying, each time when said hash value is generated for each record, whether the number of records which has generated a plurality of hash value to be generated by said hash function is 0 or 1 or 2 or larger;

executing again said hash value generating step to a plurality of said records after said update is executed to a plurality of said records of said record list; and determining, based on said counted data, whether the number of records having generated the hash value generated again is 1 or not.

12. A duplicate removal method according to claim 11, wherein said counted data includes two bits for counting whether the number of records having generated such hash value is 0 or 1 or 2 or larger corresponding to each value among a plurality of hash values which may be generated by said hash function.

13. A duplicate removal method according to claim 11, wherein said counted data expresses the number of records 0, 1, 2 or larger having generated the hash value with the natural numbers such as $0\times(3^i)$, $1\times(3^i)$, $2\times(3^i)$ when the hash value is the i-th hash value corresponding to each value of a plurality of hash values which may be generated by said hash function and a binary number expressing the total sum of such natural numbers corresponding to a plurality of said hash values; and $3^n$ is smaller than $2^{2k}$ and n>k when the total value of a plurality of said hash values generated by said hash function is n and the number of bits of said binary number is 2 k bits.

14. A duplicate removal method claimed in claim 9, further comprising a step of determining whether the average group duplicate degree of said record list is near to 1 or not is further comprised, and wherein the steps after said step of determining the possibility are executed when the average group duplicate degree of said record list is determined to be near to 1.

15. A recording medium having recorded a computer program to execute the method of claim 9 by using a computer.

16. A grouping method comprising the steps of:

generating hash value to each record among a plurality of records of record list included in a data base with a hash function using, as an argument, a value of at least a part of columns of one or more predetermined grouping columns of such records;

determining whether a value of an effective grouping column and aggregation data are stored or not in one entry corresponding to said hash value among a plurality of entries in a prepared aggregating area;

calculating the aggregation data when a record is only one record belonging to one group based on data of predetermined aggregating column of said record when said one entry does not store a value of the effective grouping column and the aggregation data;

storing a value of the grouping column of said record and said calculated aggregation data in said one entry;

determining whether the values of the stored grouping column is identical to the value of grouping column of each record having generated said hash value when said one entry has already stored the value of the grouping column and aggregation data;

updating, when the value of said grouping column stored in one entry is identical to the value of grouping column of each record having generated said hash value, said aggregation data stored in said entry to the data obtained when each record having generated said hash value is added to the group corresponding to said one entry based on the data of said aggregation column of each record having generated said hash value;

storing the data of grouping column of each record and data of aggregation column as the records not grouped when the value of the grouping column stored in said entry is different from the value of the grouping column of each record having generated said hash value;

outputting, to a plurality of records of said record list, data stored in a plurality of entries of said aggregating area as data in regard to one group after execution of the steps from said generating step to said registering step; and changing a hash function used in said generating step during the repetition of the steps by repeating the steps from said generating step to said output step to a plurality of records stored as the records not grouped in said storing step until the grouping is made for all records.

17. A grouping method according to claim 16, wherein said storing step includes a step for determining one of a plurality of divided lists to which said each record belongs depending on the value of said grouping column of said each record and storing said each record as the record belonging to one divided list and said repeating step includes a step for sequentially selecting a plurality of said divided lists and executing the steps from said generating step to said output step to a plurality of records stored in the selected divided list.

18. A recording medium having recorded a computer program to execute the method of claim 16 by using a computer.

* * * * *